Sept. 15, 1953  W. M. SCHAUFELBERGER ET AL  2,652,531
APPARATUS FOR DETERMINING MAGNETIC PROPERTIES OF WELL CORES
Filed Sept. 12, 1949  3 Sheets-Sheet 1
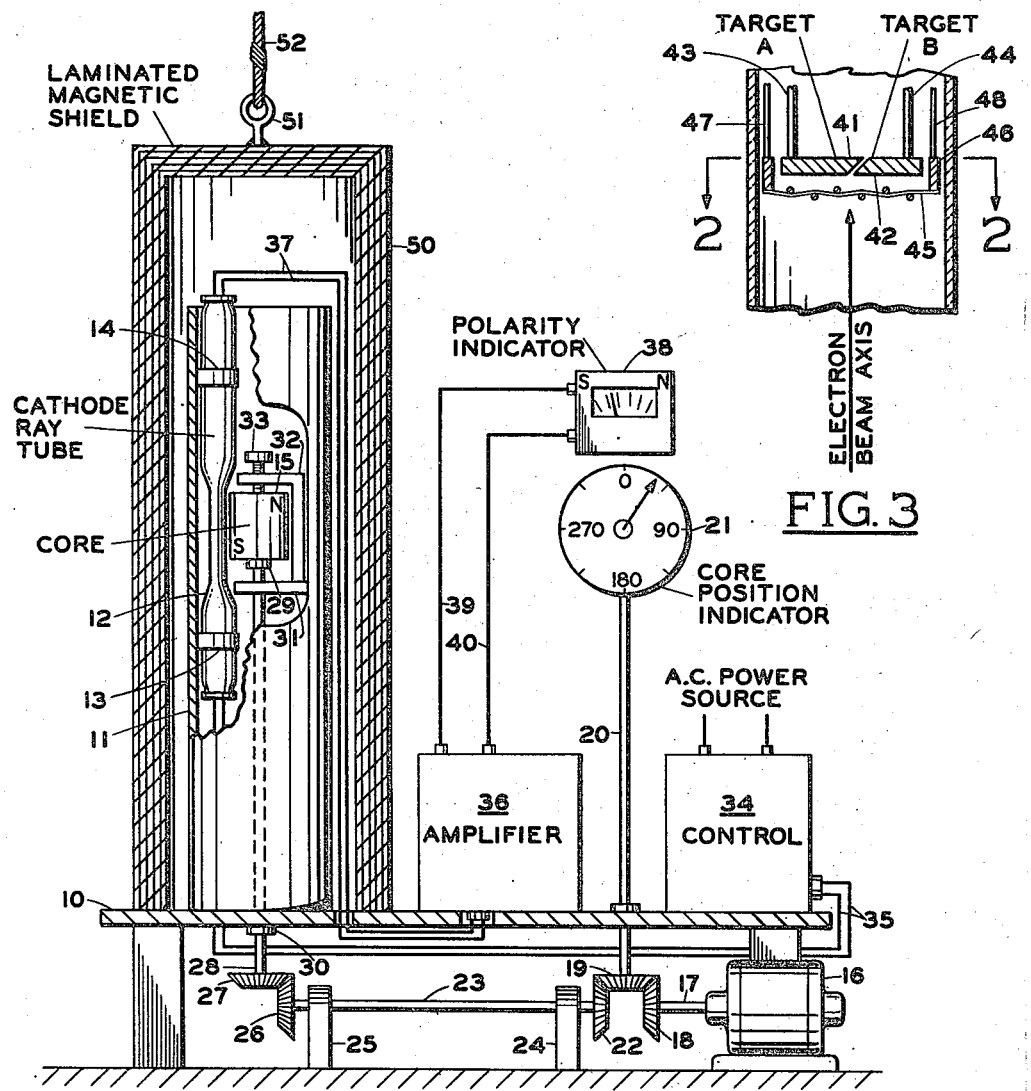
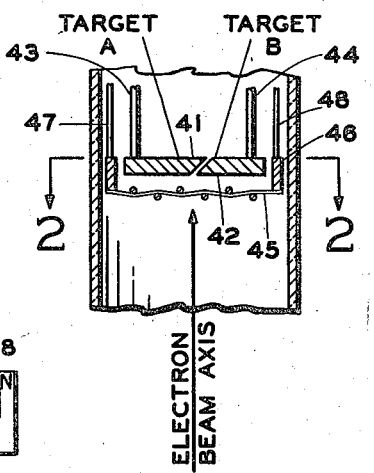
FIG. 3
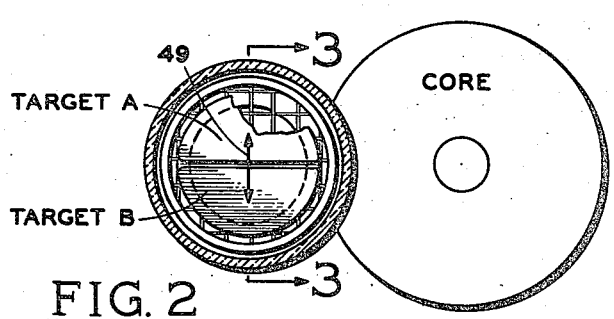
FIG. 2
INVENTORS
William M. Schaufelberger
Henry N. Herrick
Jasper R. Leggett
BY:
ATTORNEYS

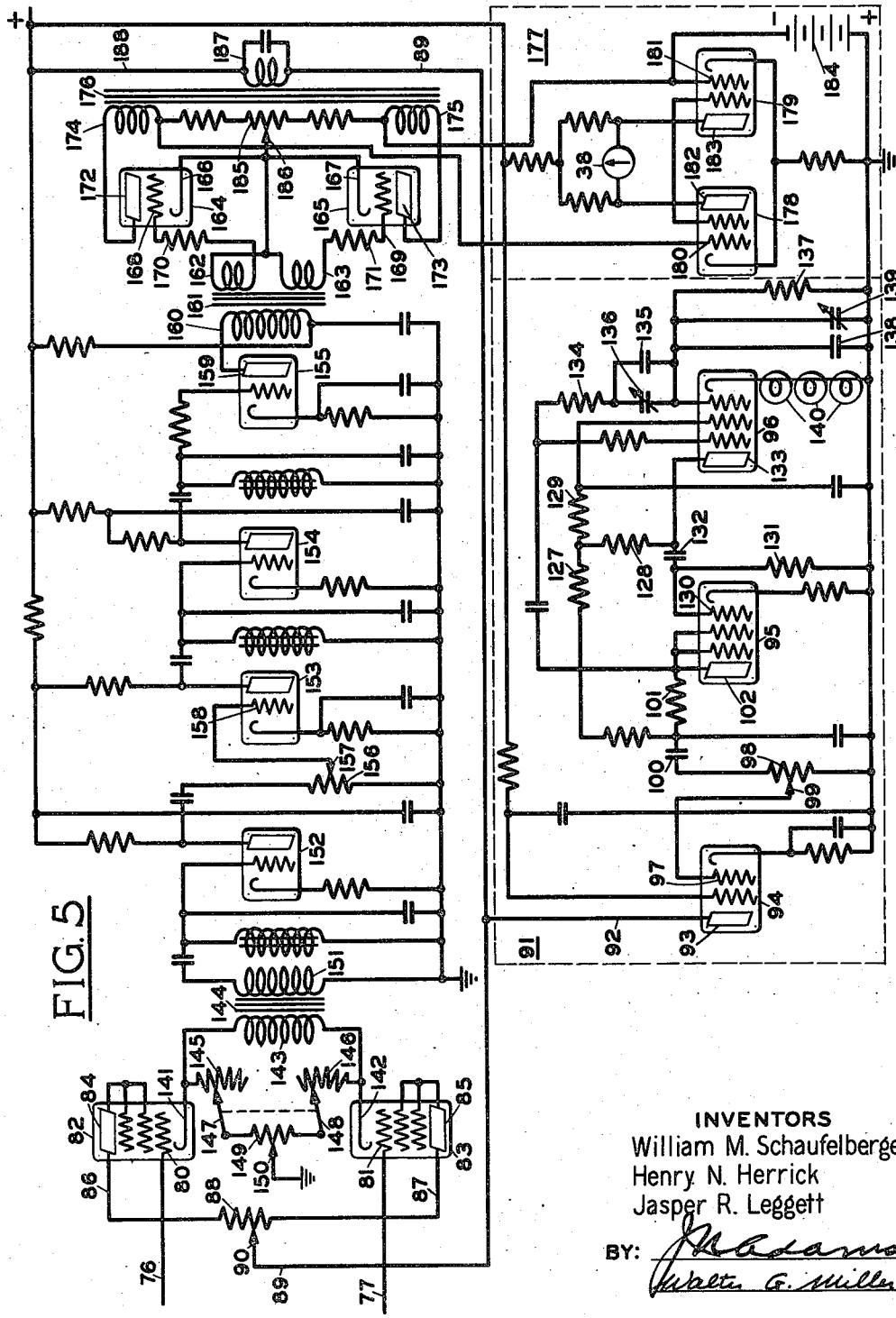

Patented Sept. 15, 1953

2,652,531

UNITED STATES PATENT OFFICE 2,652,531

APPARATUS FOR DETERMINING MAGNETIC PROPERTIES OF WELL CORES

William M. Schaufelberger, Whittier, Henry N. Herrick, Berkeley, and Jasper R. Leggett, Los Angeles, Calif., assignors to California Research Corporation, San Francisco, Calif., a corporation of Delaware Application September 12, 1949, Serial No. 115,206

3 Claims. (Cl. 324—14)

The present invention relates to apparatus for determining the magnetic characteristics of objects, and particularly relates to the orienting of cores or samples taken from the earth so that their original position within the earth may be known.

In the Herrick Patent No. 1,792,693, issued February 17, 1931, there is described a method and apparatus for orienting cores in which the core is positioned adjacent one end of a suspended magnet system and then slowly rotated while the deflection of the last-named system, due to its reaction with the residual magnetic field of the well core, is observed and the core oriented.

In the Lynton and Herrick Patent No. 2,104,752, issued January 11, 1938, there is disclosed a modification of the original Herrick apparatus utilizing an astatic magnet suspension with the axis of the magnets parallel to the core axis, the latter being placed horizontally immediately below the lower magnet.

While the method and means described in the foregoing patents were usable on a great proportion of the oil well cores which possess sufficient residual magnetism to actuate the suspended magnet systems, in certain cases the materials of the cores are so faintly magnetized that insufficient force is exerted to rotate even a delicately suspended magnet system. Furthermore, when the residual magnetism of the cores is not fairly strong, say 40 or 50 gammas, the time required to complete an orientation of the core with these systems is from an hour to an hour and a half, since the core has to be turned at a very slow rate in order that the astatic magnet system will respond adequately to the core's residual magnetism. Another difficulty encountered with these systems is in the accurate determination of the top and bottom of the core, since, during the interval between the time the core is taken at a drill hole and the orientation is performed at a laboratory, it is very possible for the identity of the tops and bottoms of the cores to become lost, so that the results determined by the astatic magnet system are not conclusive of the original position of a core in the earth.

The present invention comprehends broadly apparatus for determining the magnetic polarity of objects, such as cores, or samples of subsurface formations, by positioning them adjacent an electron beam such as that in a cathode ray tube, rotating the core or earth sample, and noting the deflection of the beam in relation to the position of the core. If the test object is a core from the earth's substrata, the magnetic orientation can be correlated to its structural axis or mass and special characteristics such as bedding planes, and the core oriented so that its original position in the earth is made known. Desirably, but not necessarily, the test object and the electron beam apparatus are at least partially shielded from external magnetic forces, such as that of the earth's field and stray electrical fields.

While it has been proposed heretofore in the prior art to use a cathode ray, or electron beam tube, for measuring the earth's field or other magnetic fields in geomagnetic, or terrestrial magnetic surveying, this type of prior art apparatus is completely unsatisfactory for the investigation of magnetic properties of earth samples, or cores. This is due to several problems peculiar to the orienting of cores. In the first place, even the strongest cores are much weaker than the stray or earth's field which the prior art apparatus was designed to measure. Hence, the residual magnetism available for deflection of the electron beam is considerably less than that required to operate such a system. Furthermore, the earth cores to be measured frequently contain particles which are magnetically susceptible to stray fields and hence may produce an erroneous reading of the true magnetic orientation of the core. Furthermore, the cores may also contain localized concentrations of magnetic secondary minerals, such as pyritized foraminifera and large pyrite crystals. These localized concentrations impart to the cores a non-uniformly magnetized field which differs considerably from the normal earth's field, which will be relatively uniform or constant for a limited area.

While it has been recognized in the prior art that for a given magnetic field, the deflection of the electron beam in such apparatus as a cathode ray tube will be inversely proportional to the square root of the operating voltage of the tube, this requires that for a very weak magnetic field the operating voltage must be reduced to such a point that it is impossible to prevent dispersion of the electron beam and hence prevents good resolution of the beam into a well-defined stream. Likewise, in these applications it has been found that when the tube operating voltage is this low, it is impossible to produce an indicating light spot to show visually the beam size and position. It is therefore necessary to rely entirely upon measuring instruments to indicate the deflection of the beam. While the beam can be more easily deflected with a weak field when the tube is operated at a low voltage, the dispersion of the beam is so wide at the receiving end of the tube that the deflection produced by a weak field is insufficient to produce a detectable deflection of the beam. Hence, even this type of apparatus cannot be readily worked with a very weak magnetic field such as that produced by the magnetic field of an earth core.

It is an object of this invention to provide an improved apparatus for determining the relationship between the magnetic axis and the structural axis of a sample of material from within the earth, for example, a well core.

Another object of this invention is to provide an improved means for determining the magnetic characteristics of an object such as a well core in a shorter length of time than that heretofore required.

It is a further object of this invention to provide an apparatus for determining the magnetic characteristics of an object by positioning the latter adjacent an electron beam, rotating the object, and noting the deflection of the electron beam.

It is a still further object of the invention to provide apparatus for magnetically orienting a well core by rotating the core adjacent an electron beam within a cathode ray tube, which is operated at a potential high enough to produce a well-defined electron beam so that the movement of the electron beam by a weak magnetic force of the core may be either visually or electrically indicated.

Further objects and advantages of the invention will be found apparent from the following description of a preferred embodiment of this device taken in conjunction with the accompanying drawings which form a part of the specification and illustrate an arrangement of the invention as applied to well core orienting.

In the drawings:

Figure 1 is a diagrammatic representation, partially in section, showing core orienting apparatus according to the present invention.

Figure 2 is a partially sectional view showing the target plates of the cathode ray tube in relation to the core.

Figure 3 is a cross-sectional view of a portion of the cathode ray tube taken in the direction of the arrows 3—3 in Figure 2.

Figure 5 is a complete connection diagram of an amplifying apparatus and the indicating circuit which is connected to the output of the cathode ray tube shown in Figure 4.

Figure 4:
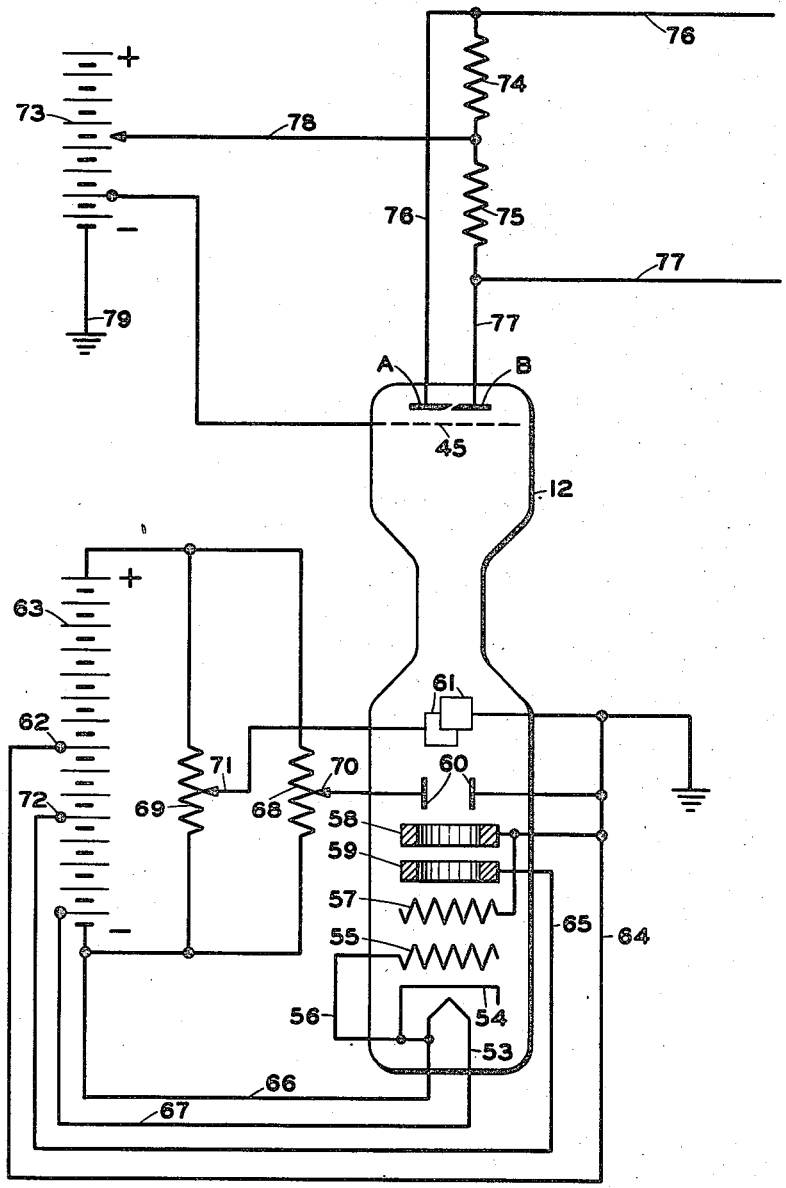
Figure 4 is a connection diagram of the cathode ray tube, including the output load for the target plates for the cathode ray tube.

Referring now to the drawings, and more particularly to Figure 1, there is shown a diagrammatic arrangement of apparatus according to the present invention wherein a base 10 provides a support for cylinder 11 upon which a cathode ray tube 12 is mounted by means of a pair of clamps 13 and 14. To provide the desired rotation of the core 15 relative to the cathode ray tube 12, a driving means such as motor 16 is provided. As shown, motor 16 is mounted below base 10 and drives bevel gear 18 mounted on shaft 17. Bevel gear 18 in turn drives bevel gear 19 which is mounted upon the lower end of shaft 20, which in turn drives the core position indicator 21. Bevel gear 19 in turn drives bevel gear 22 which is mounted on shaft 23, journaled in a pair of bearing members 24 and 25. The opposite end of shaft 23 is provided with a bevel gear 26, adapted to drive bevel gear 27 mounted upon the lower end of shaft 28. Shaft 28 provides the driving means for rotation of core 15 through a base member 29 mounted upon the upper end of shaft 28, so that the core 15 is driven in synchronism with shaft 28. As shown, shaft 28 is journaled in a bearing member 30 in base 10, and a supporting arm 31 mounted upon cylinder 11. In order to provide the upper clamping means for core 15, a brass frame or angle section 32 is mounted upon support 31, and frame 32 in turn carries an adjusting screw 33 which serves to center the core 15 during the rotation of the core. Since all of the bevel gears, 18, 19, 22, 26 and 27 are of the same pitch and diameter, it will be apparent that rod 20 will turn in synchronism with rod 28 and hence, the core will be driven in synchronism with the indicator on the core position indicator means 21, which, as shown, is marked for 360° of rotation. Means are desirably provided for controlling the spacing between core 15 and tube 12 to accommodate varying core diameters.

A control means for the cathode ray tube 12 and driving motor 16 is provided by a control box 34 which is arranged to provide A. C. for motor 16 and D. C. for cathode ray tube 12. Control box 34 is connected to an A. C. power source and interconnected by control lines 35, which indicate generally the interconnection to the electron gun portion of cathode ray tube 12 and motor 16. An amplifier indicated generally as 36 is likewise mounted upon the base 10 and is interconnected by lines 37 to the output plates of the tube 12. The output of amplifier 36 is interconnected to a polarity indicator means indicated generally as 38, which may be any appropriate type of meter means, through lines 39 and 40. As shown, polarity indicator 38 is preferably located adjacent the core position indicator 21, so that an operator may simultaneously observe both the core position indicator and the polarity indicator. In this way, the operator may observe the point at which maximum deflection of the polarity indicator occurs and at the same time note the rotational position of the core as shown by the position indicator 21.

In Figures 2 and 3 there is shown the structural details of the cathode ray tube 12 and, in particular, the target end of the tube. As shown, target A and target B are isolated from each other electrically, but are so arranged that the electron beam axis will strike the midpoint between target A and target B so that when the electron beam is centered, the targets will equally intercept the beam. This may be accomplished by an overlap between target A and target B provided by the 45-degree angular cuts 41 on target A and 42 on target B. Targets A and B are supported by conventional electrode-supporting means mounted in the end of the tube and shown broken away as supports 43 and 44. For a purpose well understood in the electronic art for preventing secondary emission of electrons from the target plates, a suppressor grid 45 is mounted between the target plates and the electron gun portion of tube 12 so that the electron beam must pass through the suppressor grid 45. Grid 45 is supported by a ring 46 mounted upon a pair of electrode supporting members 47 and 48. As shown more particularly in Figure 2, the magnetic field established by the core causes a deflection of the electron beam along the line indicated by the double-headed arrow 49. It will be understood that this movement of the beam is only indicative of the nature of the beam movement, since some departure from a 90° movement to the space between targets A and B can be tolerated without sacrifice of the efficiency in the orientation procedure.

In order to provide magnetic shielding from either terrestrial magnetism or stray magnetic fields, a laminated magnetic shield 50 which may comprise a plurality of layers of copper and "Mu" metal in concentric cylinders may be lowered around the tube 12 and core 15 by means of an eye 51 welded to the top of shield 50 and cable 52 supported by any suitable means (not shown). Desirably, all of the structures within the shield 50 are of non-magnetic material.

Reference is now made to Figures 4 and 5 wherein the electrical connections of the control means, the cathode ray tube, the amplifier, and the polarity indicator are shown in schematic form. There is shown particularly in Figure 4 the elementary connections for the cathode ray tube 12. While the electron beam generating section of the cathode ray tube 12 may be of any desired type, we have found that an electron gun of the type known commercially as the 2AP1 serves very satisfactorily for the generation of the electron beam. In this type of electron gun structure, there is provided a D. C. energized filament 53 to which the cathode 54 is internally connected as shown in Figure 4. The first grid 55 of the tube is externally connected by means of line 56 to the common connection between cathode 54 and filament 53. The second grid 57 is internally connected to the second anode 58, which with first anode 59 serves as a concentrating means for the electron beam generated by cathode 54. As shown, one of the first deflection plates 60 is connected in common with one of the second deflection plates 61, and together with second anode 58 and second grid 57 are connected to a system ground. In turn, the system ground is connected to the midpoint 62 of a D. C. power source which in the present instance is repersented by battery 63. It will be apparent that any convenient source of D. C. current may be provided, but for the sake of simplicity in the explanation, a battery is shown. The interconnection between the four electrodes and ground to the center point 62 is by means of line 64. In order to provide the desired operating potential on first anode 59, line 65, connected to anode 59, is positioned on the D. C. power source at a point slightly more negative than the common connection to which the second anode 58 is connected. It will be apparent that through line 66 the first grid, the cathode, and one side of the filament are connected to the most negative point in the D. C. power source. The desired operating potential for filament 53 is obtained by a second line 67 interconnected to the D. C. source at a point slightly more positive than the opposite side of the filament.

Since it is essential that the electron beam generated in the electron gun portion of the tube 12 be focussed so that the beam strikes target A and target B equally before deflection of the beam by a core sample, deflecting plates 60 and 61 are so arranged that an adjustable deflection may be obtained. This is provided by means of the potentiometers 68 and 69, which are respectively connected to one side of the deflecting plates 61 and 62 through adjustable center taps 70 and 71. It will be apparent to those skilled in the art that unavoidable mechanical errors in the installation of the electron gun section within one end of the tube may be compensated for by adjustment of the movable contacts 70 and 71 to electrically focus the electron beam between targets A and B. For the purpose of providing the maximum amount of potential variation across the potentiometers 68 and 69 and, accordingly, the greatest range of adjustment of the electron beam, these potentiometers are connected across the full range of the D. C. source. As an example of the operating potentials which may be placed across the electron gun portion of tube 12, point 62 of battery 63 is at approximately 500 volts potential above the negative terminal of the battery. Point 72 to which the first anode 59 is connected by means of line 65 is at approximately 125 volts above the negative terminal. As will be apparent from the foregoing explanation, the operating potential of the electron gun will be approximately 500 volts between the deflecting plates 60 and 61 and cathode 54. By virtue of the grounded connection of the plates 60 and 61, the operating potential on the plates will be zero and the preceding elements will be negative to plates 60 and 61.

A second D. C. potential operating means, represented by battery means 73, is provided for the operating and output voltage supply for the suppressor grid 45 and target plates A and B. Targets A and B are preferably connected to amplifying means through a pair of load resistors 74 and 75 by means of lines 76 and 77. Load resistors 74 and 75 are in turn connected in common to line 78, which has a variable tap connected to the battery means 73. By this arrangement, when the electron beam strikes the target plates A and B in an equal amount, the potential may be adjusted so that the desired amount of current is drawn by load resistors 74 and 75 through line 78, the connection to battery means 73, and in turn the grounded connection 79 of battery means 73. It will be understood that through grounded connection 79 and the grounded connection for the electron gun section of the tube 12, a complete circuit is established between the target plates A and B and the cathode 54. While plates A and B may be of the nonphosphorescent type, preferably they are coated to assist in the alignment of the electron beam during the focusing operation. Likewise, the phosphorescent property may be used in the orientation procedure as described hereinafter.

As stated above, the output of the target plates A and B is across lines 76 and 77, which are interconnected to the remainder of the amplifier circuit. As shown in Figure 5, these lines are interconnected to the grids 80 and 81 of tubes 82 and 83, respectively. While tubes 82 and 83 are shown to be of the pentode type, it will be noted that the screen grids and suppressor grids of these two tubes are interconnected to the plates 84 and 85 of tubes 82 and 83, respectively, so that the tubes are connected for triode operation.

In order to provide the desired A. C. voltage component for the tubes 82 and 83, anodes 84 and 85 are respectively connected to lines 86 and 87, which are interconnected to the opposite ends of a potentiometer 88. The desired A. C. voltage, as well as the D. C. plate supply voltage, are supplied by means of line 89, which is connected through a variable tap 90 on potentiometer 88. Line 89 likewise supplies an A. C. potential to the output of the amplifier, which will be more fully explained hereinafter. Line 89 is interconnected with an A. C. source provided by an oscillator means indicated generally as 91 through line 92, which is directly connected to plate 93 of the output amplifier tube 94 of oscillator 91.

It will be understood by those skilled in the art that output tube 94 serves as a power amplifying means for the A. C. potential developed by tubes 95 and 96. For the purpose of providing a variable gain through amplifier tube 94, the grid 97 of amplifier tube 94 is interconnected to an output resistor 98 through a variable tap 99. Resistor 98 is in turn connected to the output of tube 95 through a coupling capacitor 100, and a resistor 101 which is connected to plate 102 of tube 95. It will be noted that tube 95 is likewise of the pentode type but is connected as a triode, since the suppressor grid and screen grid are interconnected with the plate 102.

It will be understood by those skilled in the art that tubes 95 and 96 and the accompanying circuit compose a Wein Bridge Oscillator of conventional design. The purpose of this oscillator as it is used herein is to provide a very stable A. C. potential which is extremely constant in magnitude and frequency. Further, the nature of this oscillator is such that the generated A. C. potential is restricted to a high degree of purity to a sinusoidal potential of one frequency only. The frequency of this oscillator is determined by the equal resistors 134 and 137 and the condensers 135, 136, 138 and 139. These condensers are so adjusted that the combined capacity of condensers 135 and 136 equals the combined capacity of condensers 138 and 139, as well as to cause the oscillator to produce the frequency desired. The lamps 140 shown connected between cathode of tube 96 and ground provide inverse feedback in order to keep the magnitude of the output A. C. potential extremely constant.

Referring again to the amplifier circuit connected to tubes 82 and 83, it will be noted that the cathodes 141 and 142 are connected to the opposite ends of primary winding 143 of transformer 144. In order to insure that the A. C. potential at cathodes 141 and 142 are exactly equal prior to rotating a core, adjacent tube 12, a pair of variable resistors 145 and 146 are respectively connected to the cathodes 141 and 142. As indicated, the movable arms 147 and 148 of these resistors are mechanically interconnected and the ends connected to a variable potentiometer 149 which has its movable point 150 connected to ground. A delicate adjustment of movable arms 147, 148, 150 and 90 is provided to insure exact equality of the A. C. potential with respect to magnitude and phase at cathodes 141 and 142. In this way the tubes 82 and 83 may be matched for equal current flow with 180° opposite phasing to produce zero current flow in primary winding 143 of transformer 144 when the electron beam is centered between targets A and B in cathode ray tube 12.

Transformer 144 is provided with a secondary winding 151 which is connected to a conventional amplifier circuit comprising four stages of amplification, such as tubes 152, 153, 154, and 155. Since the features of this amplifier will be readily apparent to those skilled in the art, a further description of the individual elements of the circuit may be dispensed with. However, it will be noted that a load resistor 156 is provided in the plate circuit of tube 152. Coupling to the following stage of amplification from resistor 156 is in turn provided by a variable tap 157 which is connected to the grid 158 of tube 153 in order to give the desired variable gain for the amplifier.

For the purpose of isolating the amplifier from the discriminator circuit to be described below, plate 159 of tube 155 is connected to a primary winding 160 of transformer 161.

To provide the desired discrimination of signals amplified by the several stages of amplification, transformer 161 has a pair of secondary windings 162 and 163 which are connected in parallel to a discriminator circuit provided by tubes 164 and 165. It will be noted that the upper terminals of both secondary windings 162 and 163 are connected together and tied directly to cathodes 166 and 167 of tubes 164 and 165, respectively. The opposite terminals of windings 162 and 163 are connected to grids 168 and 169, respectively, through resistors 170 and 171, in such a manner that the A. C. potentials on grids 168 and 169 are always in phase. Plates 172 and 173 of tubes 164 and 165 are connected to opposite terminals of two windings 174 and 175 of transformer 176.

As previously mentioned, line 89 supplies an A. C. potential to the winding 187 of transformer 176. The output of transformer 176 is applied to plates 172 and 173 of tubes 164 and 165, respectively, through windings 174 and 175 in such a manner that the A. C. potential on plate 172 is 180° out of phase with the A. C. potential on plate 173. It will be understood by those skilled in the art that discrimination of the amplified signals is hereby achieved because the resulting component of D. C. potential appearing at the opposite terminals of windings 174 and 175 from plates 172 and 173 has the same polarity as the slight variation in D. C. on lines 76 and 77 at the input to the amplifier.

The component of D. C. potential results from the rectifying action of tubes 164 and 165 when the plate and grid of the tube are in phase.

The opposite terminals of windings 174 and 175 are interconnected to a vacuum tube voltmeter circuit designated generally as 177 which utilizes a pair of tubes 178 and 179 in which the grids 180 and 181 are respectively connected to windings 174 and 175. Meter means 38, which serves as the polarity indicator, is connected across the plates 182 and 183.

For the purpose of providing the proper biasing potential upon the grid circuits of the vacuum tube voltmeter means 177, a biasing source is provided, such as battery 184, which is interconnected to the grid 181 of tube 179. It will be noted that a potentiometer 185 is interconnected between the ends of windings 174 and 175 which are interconnected with the vacuum tube voltmeter means 177 for providing the desired balancing of the input voltage when zero signal is applied by the amplifier. The center tap 186 for adjusting the output of potentiometer 185 is interconnected with the common connection to the cathodes 166 and 167 of tubes 164 and 165, respectively.

It will be noted that the core 15 is positioned adjacent the recessed portion of the envelope of tube 12 so that the maximum deflection force available from the core may be exerted upon the electron beam generated by the tube. With the core so positioned and the electron beam energized within tube 12, motor means 16 may be energized so that the core may be rotated adjacent the electron beam. Due to the residual magnetism of the core, the electron beam will be shifted from its normal position, that is, exactly centered between the targets A and B, to impinge upon either target A or B, depending upon the polarity of the core.

Figure 1 of the drawings illustrates the core 15 marked with a north-and-south indication to designate generally the direction of the north-south axis through such a core. It is well understood in the art of magnetically orienting cores that such cores will have a magnetic axis asymmetric to the axis of the core itself. Due to this asymmetry of the magnetic axis, the electron beam within tube 12 may be caused to be deflected as a function of the direction of this asymmetrical axis. For example, when the core 15 is rotated so that the section of the edge which was nearest the north in its original location in the earth is facing the electron beam, that beam will be repelled to its greatest extent and, conversely, the section of the core farthest from the north in its original location in the earth will attract the electron beam. Due to this attraction and repulsion of the electron beam by virtue of the magnetic properties of the core, the electron beam is deflected between target A and target B. In the present application, this deflection is measured electrically by determining the greatest amount of current drawn through either target A or target B. When the electron beam is deflected, say, to target A, the amount of current drawn through load resistor 74 will increase and, simultaneously, a decrease in the load current flowing in resistor 75 will occur due to the deflection of the beam from target B.

Due to the change in the IR drop across resistors 74 and 75, a change in the D. C. potential on grids 80 and 81 of tubes 82 and 83 will occur simultaneously, causing a rise in potential at one of the grids and a decrease in the other grid.

It will be understood by those skilled in the art that when the grid potential of grids 80 and 81 are varied in the above manner, tubes 82 and 83 may be made more or less conductive, so that the instantaneous polarity of the A. C. voltage in primary winding 143 of transformer 144 is controlled by the shift in the grid voltages of tubes 82 and 83. The signal thus received at transformer 144 is then amplified by the four stages of amplification provided by tubes 152, 153, 154, and 155. As mentioned hereinbefore, the output of these stages of amplification is applied to primary winding 160 of transformer 161 and then applied to a discriminator circuit provided by secondary windings 162 and 163 which are connected to tubes 164 and 165. It will be understood that the instantaneous polarity of the amplified A. C. signal applied to secondary windings 162 and 163 will vary in accordance with the instantaneous polarity of the signal applied at transformer 144. When the A. C. potential on grid 168 is in phase with the A. C. potential on plate 172, the A. C. potentials on grid 169 and plate 173 will be 180° out of phase. Under this condition, tube 164 will conduct more, tube 165 will conduct less, and the D. C. potential at grid 180 will be more positive than at grid 181. Conversely, when the A. C. potential on grid 169 is in phase with the A. C. potential on plate 173, the A. C. potentials on grid 168 and plate 172 will be 180° out of phase, so that tube 164 will conduct less, tube 165 will conduct more, and the D. C. potential at grid 180 will be more negative that at grid 181.

By virtue of the D. C. potentials developed by tubes 164 and 165, grids 180 and 181 of tubes 178 and 179, respectively, are varied in direction and amount proportional to the direction of the signal received from tubes 82 and 83 which are, in turn, an indication of the polarity of the incoming signal derived from the cathode ray tube 12 and produced by the location of the magnetic field of core 15. Since grids 180 and 181 control the conductivity of tubes 178 and 179, meter means 38, which serves as the polarity indicator, is deflected in accordance with the magnetic field of core 15. Accordingly, with the drive motor 16 arranged to simultaneously rotate core 15 and the core position indicator 21, it is possible to locate the polarity indicator means 38 as shown in Figure 1, so that the operator of the core-orienting apparatus is informed simultaneously as to the position of the core with respect to the point of maximum and minimum deflection of the polarity indicator.

To calibrate the unit, shield 50 surrounding the cathode ray tube 12 and the core positioning means is raised. An artificial core carrying a magnetized needle or bar of known orientation and N-S polarity or a natural core or earth sample 15, which may be of any suitable configuration but, as shown in the drawing, is preferably a cylinder whose magnetic axis has been definitely established and marked, is seated upon the base member 29 on shaft 28 and then clamped by means of adjusting screw 33 with the N-S axis in known relationship, for example, 90°, to the zero of position indicator 21. With the core 15 in a rotatable position adjacent the cathode ray tube 12, shield 50 is lowered into the position shown in Figure 1.

Upon starting motor 16, the polarity indicator 38 and core position indicator 21 will repeatedly indicate, respectively, the deflection of the electron beam in tube 12 due to the known field polarity of the test core, and the relation of that deflection to the marked position of the core with regard to the zero of the position indicator. As shown in Figure 2, the targets A and B of the tube 12 are desirably arranged with the direction of the gap in the plane connecting the axes of the tube 12 and core 15, although the geometry of the tube and the time constant of the amplifier may require deviations from that position. The arrangement may be zeroed by placing the test core with its known magnetic axis 90° displaced from the plane just mentioned and the electron beam positioned between targets A and B, so that equal current is drawn through resistors 74 and 75. This may be done by varying the potentials on deflector plates 60 and 61 through adjustment of center taps 70 and 71, respectively, of potentiometers 68 and 69. After the beam has been centered, core 15 is again rotated to check the operation of the amplifier and permit necessary adjustments of gain and sensitivity so that the maximum deflection of polarity indicator meter 38 occurs when the known direction of the magnetic axis is indicated by core position indicator 21. After calibration of the device, any unknown core or earth sample, the orientation of which is to be determined with respect to bedding planes or other physical characteristics, may be placed on base member 29, and its N-S polarity identified by simultaneous observation of the polarity indicator 38 and position indicator 21.

It will be apparent to those skilled in the art that various changes and modifications may be made without departing from the scope of the invention disclosed hereinabove. Among these modifications and changes which may be made without departing from the invention, it may be found desirable to rotate the core about other axes, for example, an axis 90° to the axis of the electron beam, instead of rotated parallel to the axis of the electron beam. However, under these circumstances, it may be necessary to perform two separate rotations of the core in which the ends of the core are reversed in order to definitely identify the top and bottom of the core in its original disposition within the earth.

A further modification which could be made in the present apparatus would be the replacement of a separate glass envelope for the cathode ray tube and providing an evacuable system wherein the core means could be driven within an evacuated system provided with an electron gun and target means according to the present invention, so that the cathode ray, or electron beam, would be immediately adjacent the core. While this type of apparatus would require considerably greater expense in the equipment, certain applications may well justify such an investment to orient a particularly weak core, since the distance between the core and the electron beam may be of considerable importance.

It will also be apparent to those skilled in the art that the indication of the deflection of the electron beam may be wholly by optical means, such as by an optical system with amplifying means provided for observing the optical deflection of the electron beam impinging on targets A and B.

Further changes and modifications will be apparent to those skilled in the art without departing from the scope of the present invention, and all such changes and modifications as fall within the scope of the appended claims are hereby included.

We claim:

1. Magnetic core orienting apparatus for indicating the magnetic axis of an earth core comprising an electron beam tube having a pair of plates adapted to intercept said beam in equal proportion, core rotating means adapted to rotate said core adjacent the axis of said beam, magnetic shielding means surrounding said tube and said rotating means to eliminate the magnetic effect of earth's field, amplifying means connected to the plates of said tube to determine the direction of movement of said beam between said plates, meter means operable by said amplifying means, and position-indicating means drivable by said core-rotating means located adjacent said meter means so that the direction and amplitude of the movement of said meter may be noted in respect to the position of said core and thereby identify the magnetic axis of said core.

2. Magnetic core orienting apparatus comprising a cathode ray tube having an electron beam source and a pair of target plates adapted to intercept said beam, means for rotatably mounting an earth core having a weak magnetic field adjacent said beam and intermediate said source and said plates, means for rotating said mounting to vary the position of the magnetic field of said core with respect to said electron beam to produce a deflection of said beam, said beam being effected by said core to move between said plates, means synchronized with said core rotating means for indicating the position of said core with respect to said beam, and means adjacent said core position indicating means for indicating the direction of movement of said beam with respect to said target plates under the influence of said core.

3. Apparatus for magnetically orienting an earth core comprising an electron beam source, a pair of transversely spaced plates in the path of said beam, said beam being directly substantially into the space between said plates, a rotatable core holder at one side of said beam between said electron source and said plates, said holder having its axis of rotation parallel to said electron beam, means synchronized with the rotation of said holder for continuously indicating the position of a known point on said core, and on indicating means adjacent said core position indicating means responsive to the deflection of said electron beam from one to the other of said plates due to the magnetic field of said core.

WILLIAM M. SCHAUFELBERGER.
HENRY N. HERRICK.
JASPER R. LEGGETT.

References Cited in the file of this patent

UNITED STATES PATENTS

| Number | Name | Date |
| --- | --- | --- |
| 1,792,639 | Herrick | Feb. 17, 1931 |
| 2,164,302 | Barnes et al. | July 4, 1939 |
| 2,211,158 | Pearson | Aug. 13, 1940 |
| 2,358,901 | Ziebolz | Sept. 26, 1944 |
| 2,371,176 | Kirk et al. | Mar. 13, 1945 |
| 2,437,374 | Burroughs | Mar. 9, 1948 |
| 2,441,269 | Hartig | May 11, 1948 |

FOREIGN PATENTS

| Number | Country | Date |
| --- | --- | --- |
| 475,369 | Great Britain | Nov. 18, 1937 |